(12) United States Patent
Kubie

(10) Patent No.: US 11,099,583 B2
(45) Date of Patent: Aug. 24, 2021

(54) REAL-TIME OPTIMIZATION OF AUTONOMOUS VEHICLE ROUTES

(71) Applicant: Wing Aviation LLC, Mountain View, CA (US)

(72) Inventor: Martin Kubie, San Francisco, CA (US)

(73) Assignee: WING AVIATION LLC, Mountain View, CA (US)

( * ) Notice: Subject to any disclaimer, the term of this patent is extended or adjusted under 35 U.S.C. 154(b) by 247 days.

(21) Appl. No.: 16/409,563

(22) Filed: May 10, 2019

(65) Prior Publication Data

US 2020/0356115 A1 Nov. 12, 2020

(51) Int. Cl.
| | | |
|---|---|---|
| *G05D 1/10* | (2006.01) | |
| *G05D 1/00* | (2006.01) | |
| *B64C 39/02* | (2006.01) | |
| *G01C 21/20* | (2006.01) | |

(52) U.S. Cl.
CPC ........... *G05D 1/106* (2019.05); *B64C 39/024* (2013.01); *G01C 21/20* (2013.01); *G05D 1/0088* (2013.01); *B64C 2201/128* (2013.01); *B64C 2201/141* (2013.01)

(58) Field of Classification Search
CPC .. G05D 1/106; G01C 21/20; B64C 2201/141; G08G 5/0034; G08G 5/0039; G08G 5/0069
See application file for complete search history.

(56) References Cited

U.S. PATENT DOCUMENTS

| | | | |
|---|---|---|---|
| 9,274,529 B2 * | 3/2016 | Ben-Shachar | ....... G05D 1/0072 |
| 9,754,496 B2 | 9/2017 | Chan et al. | |
| 10,279,906 B2 | 5/2019 | Levien et al. | |
| 2016/0307447 A1 | 10/2016 | Johnson et al. | |
| 2017/0263132 A1 * | 9/2017 | Butler | .................. G08G 5/0013 |
| 2017/0278409 A1 | 9/2017 | Johnson et al. | |
| 2017/0344000 A1 * | 11/2017 | Krishnamoorthy | .... G08G 5/025 |
| 2018/0231981 A1 * | 8/2018 | Starter | ................. G05D 1/0297 |
| 2018/0239350 A1 | 8/2018 | Cantrell | |
| 2019/0009904 A1 | 1/2019 | Winkle et al. | |
| 2019/0086219 A1 * | 3/2019 | Hashisho | ............... G01C 21/20 |
| 2019/0130770 A1 | 5/2019 | Di Benedetto et al. | |
| 2020/0193844 A1 * | 6/2020 | Mahkonen | ........... G08G 5/0052 |

OTHER PUBLICATIONS

International Search Report and Written Opinion, dated Jul. 27, 2020 in corresponding International Patent Application No. PCT/US2020/028331, 11 pages.
"Virginia Tech, Project Wing, and Partners Team up With NASA on Unmanned Traffic Management," Virginia Tech Daily, Jun. 7, 2017, 8 pages.

* cited by examiner

*Primary Examiner* — Michael J Zanelli
(74) *Attorney, Agent, or Firm* — Christensen O'Connor Johnson Kindness PLLC

(57) ABSTRACT

Techniques are provided to improve routing of autonomous vehicles through highly congested areas. In some embodiments, routes that include sequences of timed space reservations are provided to autonomous vehicles by a route reservation system. In some embodiments, the route reservation system detects route alteration states (including but not limited to an arrival of an autonomous vehicle at a waiting area), determines a new route for the autonomous vehicle that passes through the highly congested area, and transmits the new route to the autonomous vehicle for navigating from the waiting area to an endpoint.

20 Claims, 12 Drawing Sheets

REAL-TIME OPTIMIZATION OF AUTONOMOUS VEHICLE ROUTES

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a non-transitory computer-readable medium is provided. The computer-readable medium has computer-executable instructions stored thereon that, in response to execution by one or more processors of one or more computing devices, cause the computing devices to perform actions for updating a reserved route for an autonomous vehicle. The actions comprise planning a new route to replace the reserved route; transmitting the new route to the autonomous vehicle; and, in response to receiving a confirmation from the autonomous vehicle that the new route was accepted, deleting one or more timed space reservations associated with the reserved route.

In some embodiments, an autonomous vehicle is provided. The autonomous vehicle comprises a communication interface, one or more propulsion devices, one or more processors, and a computer-readable medium. The computer-readable medium has computer-executable instructions stored thereon that, in response to execution by the one or more processors, cause the autonomous vehicle to perform actions including: operating the propulsion devices to cause the autonomous vehicle to traverse a reserved route; and while traversing the reserved route: receiving, via the communication interface, an updated route; analyzing the updated route to determine whether the updated route is acceptable; and in response to determining that the updated route is acceptable: transmitting, via the communication interface, an acknowledgement of the updated route; and operating the propulsion devices to cause the autonomous vehicle to traverse the updated route instead of the reserved route.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Autonomous vehicles, including but not limited to aircraft such as unmanned aerial vehicles (UAVs), are becoming more frequently used for a variety of tasks. For example, autonomous vehicles are often used to accomplish missions related to logistics, such as delivering packages from a centralized warehouse to various destinations, or rearranging in-stock items within a warehouse. Because the availability of reliable high-bandwidth communication between an autonomous vehicle and a centralized controller cannot be assumed (particularly when operating outside of line-of-sight of the centralized controller), routes and other missions may be transmitted from a centralized controller to an autonomous vehicle before the autonomous vehicle departs, and the autonomous vehicle may then autonomously navigate the assigned route.

While autonomous vehicles use various onboard sensors for navigation, the vehicles (particularly aircraft) may not include sensors or peer-to-peer communication that would allow the vehicles to avoid each other while navigating. To increase safety, the centralized controller can assign routes for autonomous vehicles such that no two vehicles are expected to be within a predetermined safety radius of each other at any point in time.

Figure 1A:
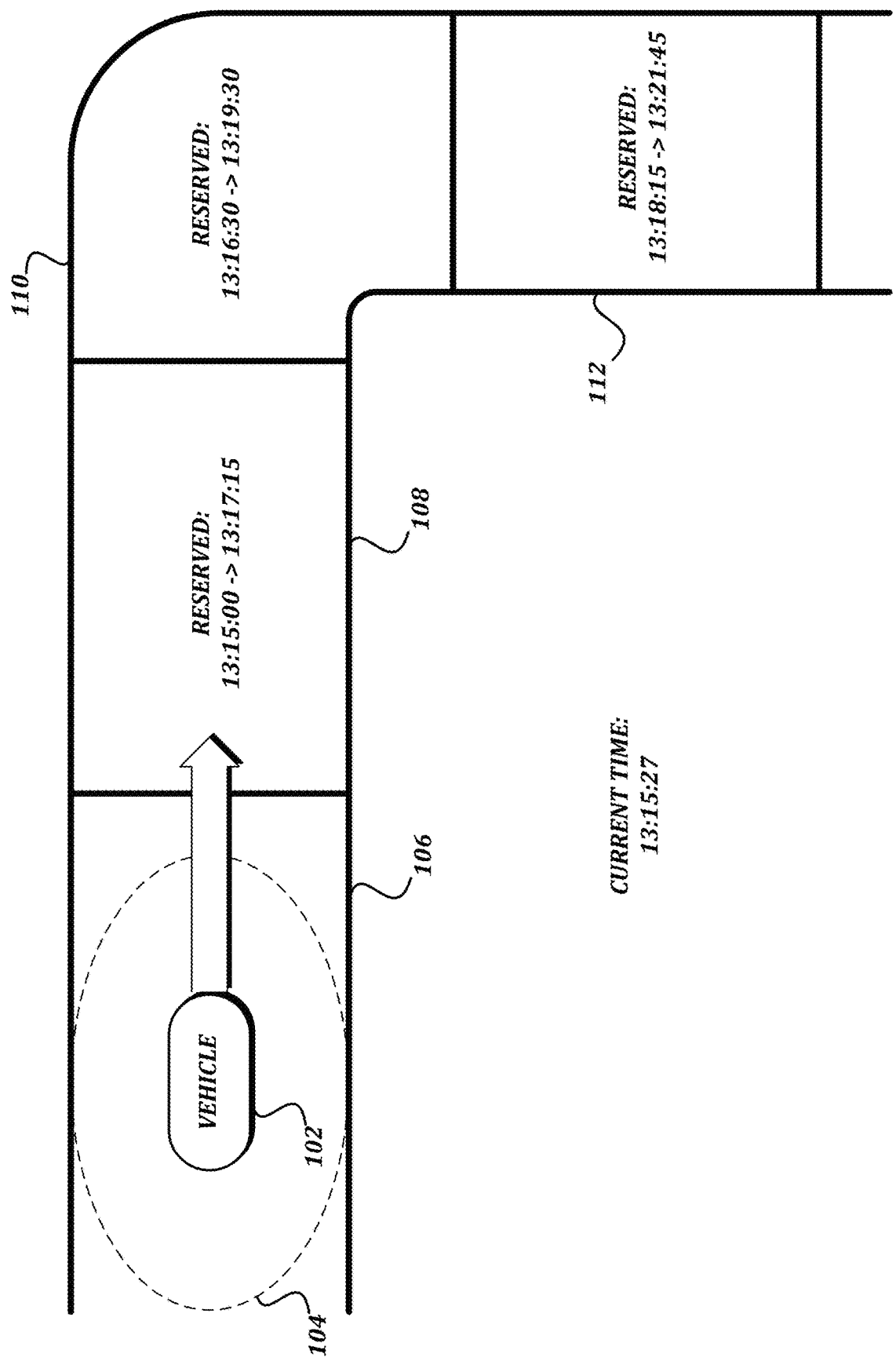
FIGS. 1A-1B illustrate a non-limiting example embodiment of an autonomous vehicle navigating a route assigned by a centralized controller according to various aspects of the present disclosure.
Figure 1B:
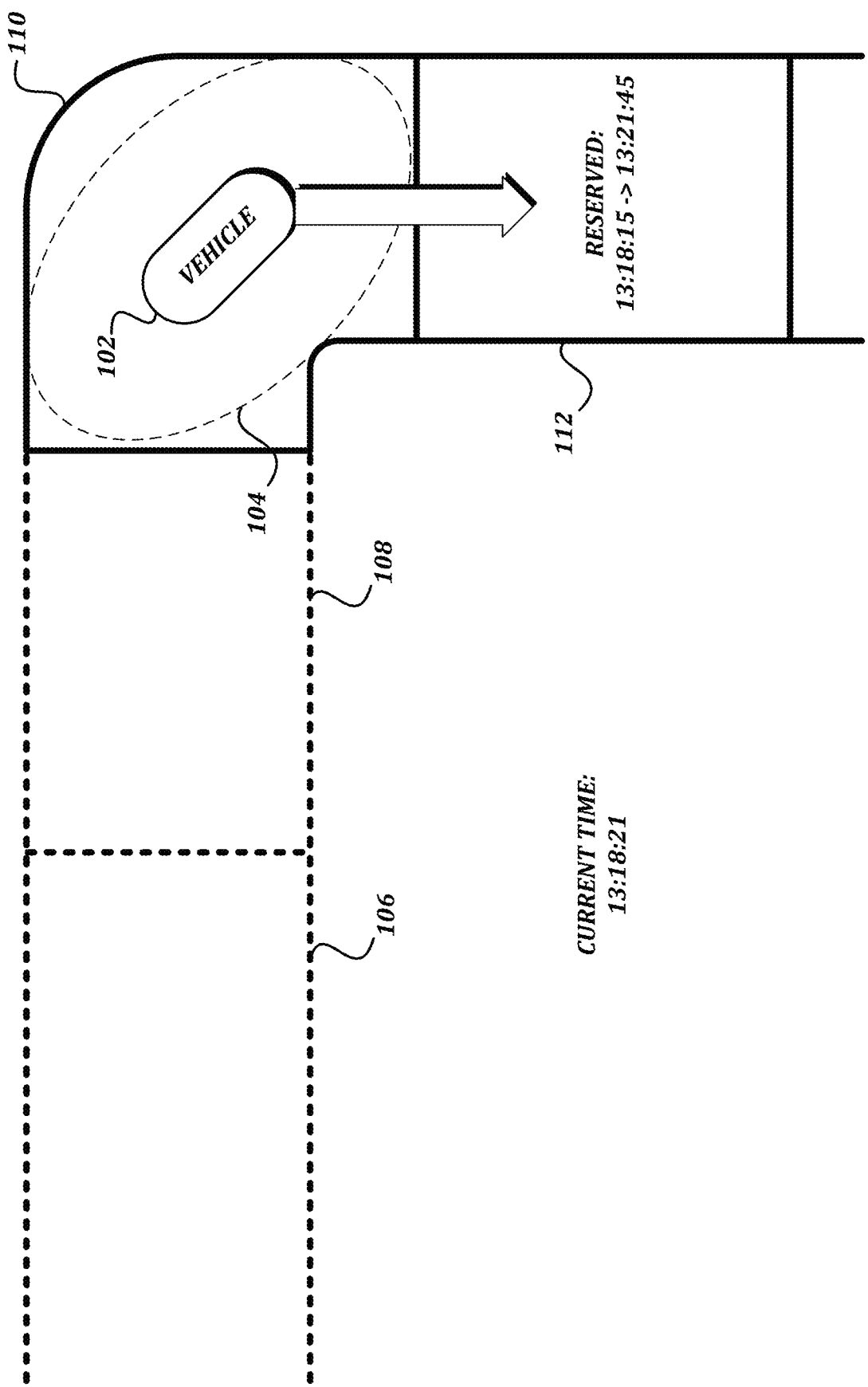

FIGS. 1A-1B illustrate a non-limiting example embodiment of an autonomous vehicle navigating a route assigned by a centralized controller according to various aspects of the present disclosure. As shown, the route includes a sequence of timed space reservations 106, 108, 110, 112. Each timed space reservation is a reservation tracked by the centralized controller of an area (two dimensions) or volume (three dimensions) for a given time period during which the vehicle 102 is expected to transit the area or volume. The centralized controller stores the timed space reservations for use in planning routes to be assigned to vehicles, and the centralized controller ensures that no two vehicles are expected to be within the same space at the same time based on the timed spaced reservations. The timed space reservations are sized to accommodate both the vehicle 102 and a safety margin 104 around the vehicle 102. The vehicle 102 may be unaware of the reservations, and may simply be provided with a path to autonomously navigate that passes through the reserved spaces.

As shown in FIG. 1A, the current time is 13:15:27, and the vehicle 102 is within a first timed space reservation 106. While navigating the path, the vehicle 102 will next enter a space associated with a second timed space reservation 108. The second timed space reservation 108 is reserved from 13:15:00 to 13:17:15, and the vehicle 102 is expected to transit through the space associated with the second timed space reservation 108 during that time. The vehicle 102 will then transit a space associated with a third timed space reservation 110, reserved from 13:16:30 to 13:19:30, and then a space associated with a fourth timed space reservation 112, reserved from 13:18:15 to 13:21:45. One will note that as the sequence progresses, the time period reserved for each timed space reservation grows. This is done in order to accommodate accumulated uncertainty in the transit times of each timed space reservation. The illustrated time periods for which the timed space reservations are reserved are non-limiting examples, and in various embodiments, the amount of time reserved in each timed space reservation and the amount of increase in the time period over the sequence of timed space reservations may be different from those illustrated.

In some embodiments, the entire sequence of timed space reservations may be retained by the centralized controller until the vehicle 102 has completed the entire route. However, maintaining the reservations for the entire path may be overly restrictive, in that it can be assumed that, after the end time of the timed space reservation has expired, the vehicle 102 is no longer within the associated space, and the associated space could therefore be reused for another route. FIG. 1B illustrates cleanup performed by the centralized controller while the vehicle 102 is navigating the route. In FIG. 1B, the current time is 13:18:21, and the vehicle 102 is assumed by the centralized controller to be within the space associated with the third timed space reservation 110. Accordingly, the centralized controller has deleted the first timed space reservation 106 and the second timed space reservation 108, neither of which represent spaces where the vehicle 102 is expected to be present in the future. The combination of the future timed space reservations such as the fourth timed space reservation 112 and the deletion of the past timed space reservations 106, 108 allow the vehicle 102 to transit through space that is expected to be clear from conflicts while maximizing the use of space that has already been transited through.

Figure 2:
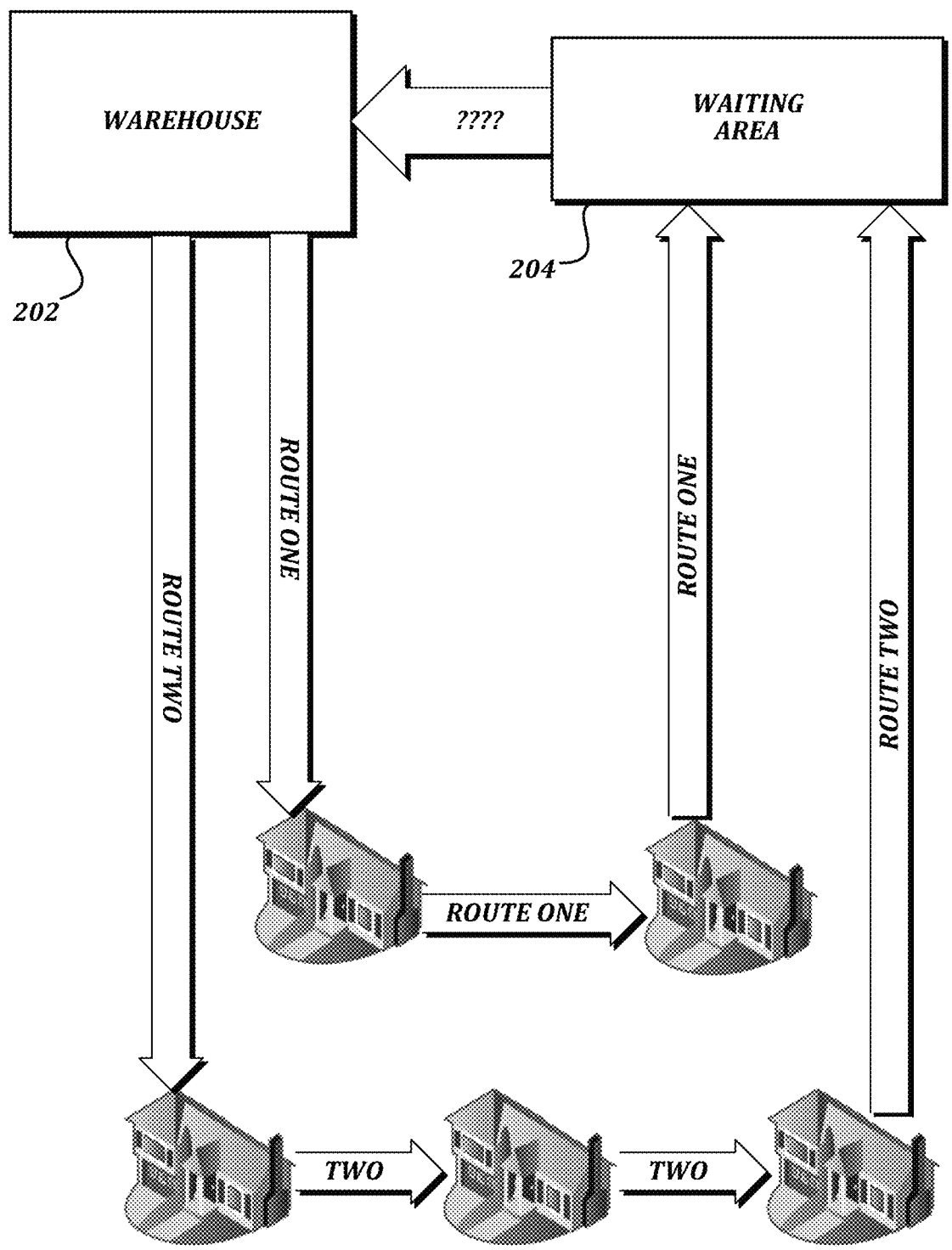
FIG. 2 illustrates an example embodiment wherein vehicles are expected to travel through a high-traffic bottleneck.

While these techniques can be effective in deconflicting the travel of autonomous vehicles, problems arise in situations where vehicles are expected to travel through common paths or other high-traffic bottlenecks. FIG. 2 illustrates an example embodiment wherein vehicles are expected to travel through a high-traffic bottleneck. As shown, vehicles leave from a warehouse 202, travel through a route, and then pause in a waiting area 204 close to the warehouse 202. A first vehicle may travel along route one to visit a first location and a second location before returning to the waiting area 204, and a second vehicle may travel along route two to visit a third location, a fourth location, and a fifth location before returning to the waiting area 204.

The warehouse 202 may have a limited area through which vehicles must travel while returning, such as an opening in a wall for aircraft, or a garage entrance for wheeled vehicles, so returning vehicles will wait in the waiting area 204 until the area to return to the warehouse 202 is expected to be clear. When combining multiple vehicles transiting routes provided by a centralized controller as described above, it is clear that the path from the waiting area 204 to the warehouse 202 is a significant bottleneck. The centralized controller is configured to provide a route to each vehicle that is expected to be clear from the start to the endpoint while the vehicle is navigating the route. However, the uncertainty of the vehicle's location grows for each timed space reservation in the route. Accordingly, the timed space reservation from the waiting area 204 to the warehouse 202 will be for a significantly long amount of time.

As a non-limiting example, if a first timed space reservation is a minute long (that is, the vehicle is expected to transit through the space associated with the first timed space reservation in a minute or less), and each timed space reservation in the sequence is thirty seconds longer than the previous timed space reservation to accommodate accumulating positional uncertainty, then a route that includes only ten timed space reservations will have a final timed space reservation that lasts for five minutes and thirty seconds. If the route has an endpoint within the warehouse 202, then this means that the path from the waiting area 204 to the warehouse 202 will be blocked off for five minutes and thirty seconds, even though the vehicle would be expected to transit the path from the waiting area 204 to the warehouse 202 in a minute or less. This severely limits the number of vehicles that can be accommodated by the system.

This problem is particularly significant for aircraft. While aircraft could land in a waiting area 204 near a warehouse 202 while awaiting an opportunity for the path to the warehouse 202 to clear, the limited space in the landing area (particularly when accommodating a safety margin around each aircraft) limits the number of aircraft that can be accommodated. It is desirable to have aircraft hover in the waiting area 204 instead of landing, so that aircraft could be stacked vertically as well as horizontally in order to accommodate more aircraft in the waiting area 204. However, aircraft that are hovering will be expending battery power, and so may not be able to hover in the waiting area 204 for significant amounts of time without significantly limiting the range the vehicle can cover on the path. What is desired are techniques for managing timed space reservations that help reduce the amount of time that vehicles must wait in a waiting area before traveling through a high-traffic bottleneck.

In some embodiments of the present disclosure, a route reservation system is augmented to automatically optimize and adjust routes for autonomous vehicles in real-time. In some embodiments, the route reservation system generates routes that include sequences of timed space reservations in advance of an autonomous vehicle navigating the route. The timed space reservations serve to exclude other autonomous vehicles from the associated space during the indicated time period. The routes act as a baseline to be followed by the autonomous vehicles in the absence of the receipt of further instructions, and should allow the aircraft to safely travel through the route without being in conflict with another autonomous vehicle under control of the route reservation system. When an autonomous vehicle arrives in a defined area near a high-traffic bottleneck area such as a warehouse 202 endpoint, a final route can be determined by the route reservation system and transmitted to the autonomous vehicle to replace the baseline route. The final route can include tighter reservation margins due to a lack of accumulated uncertainty error, thus allowing many more autonomous vehicles to transit through the high-traffic bottleneck.

Figure 3:
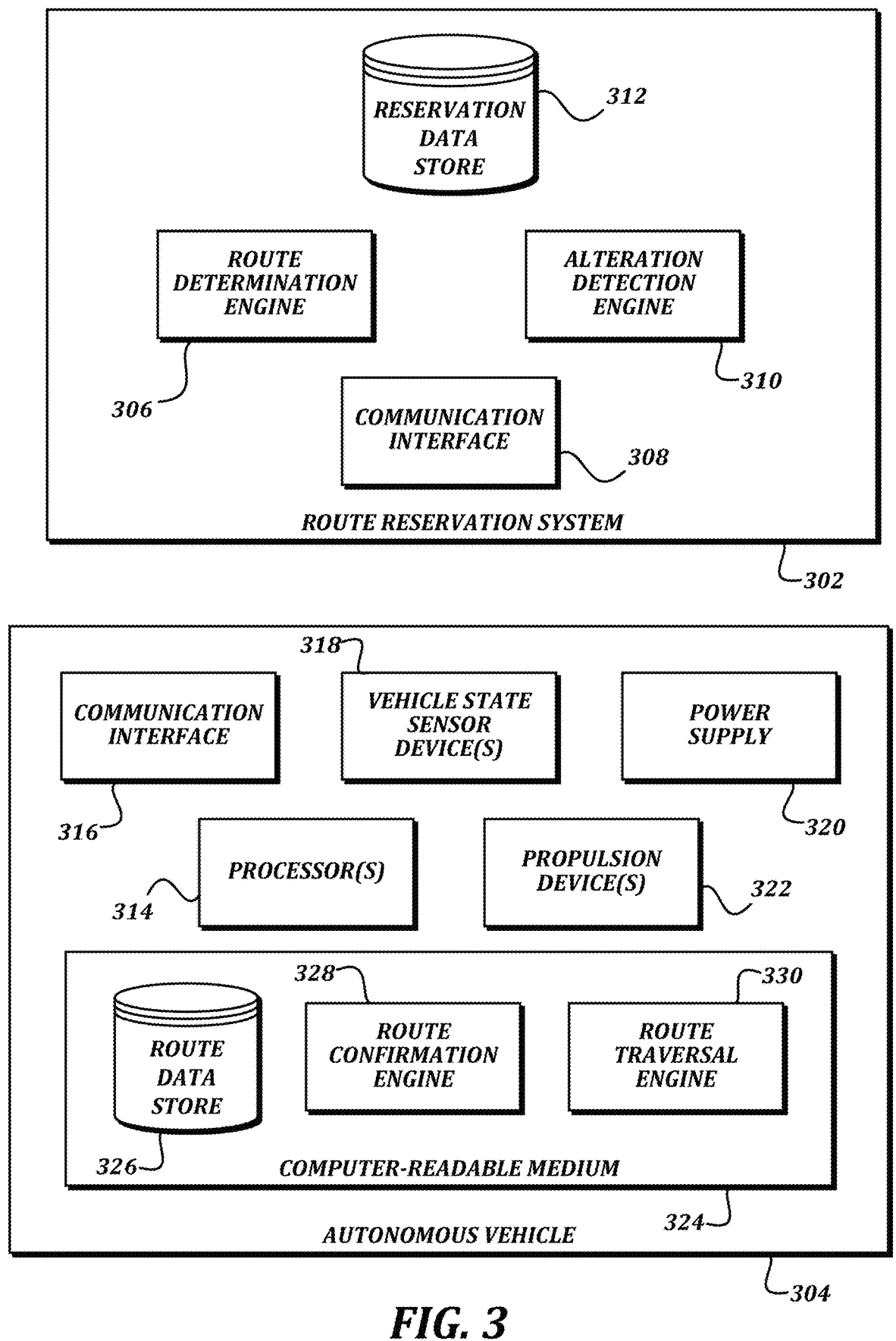
FIG. 3 is a block diagram that shows components associated with a non-limiting example embodiment of a route reservation system and a non-limiting example embodiment of an autonomous vehicle according to various aspects of the present disclosure.

FIG. 3 is a block diagram that shows components associated with a non-limiting example embodiment of a route reservation system and a non-limiting example embodiment of an autonomous vehicle according to various aspects of the present disclosure.

The route reservation system 302 is configured to generate routes for autonomous vehicles to safely travel, and to transmit the routes to the autonomous vehicles. In some embodiments, the route reservation system 302 includes one or more computing devices, such as desktop computing devices, laptop computing devices, rack-mounted server computing devices, tablet computing devices, mobile computing devices, or other computing devices that are configured to provide the components described below. In some embodiments, the route reservation system 302 includes one or more computing devices of a cloud computing system that are configured to provide the components described below.

As shown, the route reservation system 302 includes a communication interface 308, a route determination engine 306, an alteration detection engine 310, and a reservation data store 312.

In some embodiments, the route determination engine 306 is configured to plan non-conflicting routes for transmission to autonomous vehicles. The route determination engine 306 uses a start location, an endpoint, and one or more waypoints to determine a path to be traveled, and then determines a sequence of timed space reservations along the path which do not overlap any other timed space reservations in order to ensure that the path may be safely traveled.

In some embodiments, the alteration detection engine 310 is configured to detect conditions which indicate that a new route should be calculated and transmitted to an autonomous vehicle. As discussed in further detail below, the conditions may include but are not limited to arrival at a waiting area 204, a fault condition on the autonomous vehicle, and removal of an obstacle or conflicting timed space reservation.

In general, the word "engine," as used herein, refers to logic embodied in hardware and/or software instructions, which can be written in a programming language, such as C, C++, C #, COBOL, JAVA™, PHP, Perl, HTML, CSS, JavaScript, VBScript, ASPX, Microsoft .NET™, Go, and/or the like. An engine may be compiled into executable programs or written in interpreted programming languages. Engines may be callable from other engines or from themselves. Generally, the engines described herein refer to logical components that can be merged with other engines, or can be divided into sub engines. The engines can be stored in any type of computer-readable medium or computer storage device and be stored on and executed by one or more general-purpose computers, thus creating a special-purpose computer configured to provide the engine.

The communication interface 308 includes hardware and software to enable any suitable communication technology for communicating with autonomous vehicles. In some embodiments, the communication interface 308 of the route reservation system 302 may be a wired interface such as Ethernet, USB, FireWire, or other wired communication technology that allows the route reservation system 302 to access a local area network. The local area network to which the communication interface 308 is communicatively coupled may include one or more Wi-Fi access points (or other wireless access points) that allow other devices to communicate with the route reservation system 302 via wireless communication technologies. The local area network may also be couple to a wide area network, such as the Internet. The communication interface 308 will typically be a wired communication interface 308 due to the nature of the route reservation system 302, but this embodiment should not be seen as limiting. In some embodiments, the communication interface 308 may be a wireless communication interface 308 configured to provide wireless communication using a technology including but not limited to Wi-Fi, WiMAX, 2G, 3G, 4G, 5G, LTE, or Bluetooth.

The reservation data store 312 is configured to store sequences of timed space reservations associated with routes to be traversed by autonomous vehicles. The route reservation system 302 may access the reservation data store 312 to determine whether a desired timed space reservation is available, and may store new timed space reservations when they are determined to not be in conflict with existing timed space reservations. The route reservation system 302 may delete timed space reservations from the reservation data store 312 once the end of the reserved time period has passed, as described above.

As understood by one of ordinary skill in the art, a "data store" as described herein may be any suitable device configured to store data for access by a computing device. One example of a data store is a key-value store. However, any other suitable storage technique and/or device capable of organizing and storing the data may be used, such as a relational database management system (RDBMS), an object database, and/or the like. Other examples of a data store may also include data stored in an organized manner on a computer-readable storage medium.

One example of a data store which includes reliable storage, but also low overhead, is a file system or database management system that stores data in files (or records) on a computer readable medium such as flash memory, random access memory (RAM), hard disk drives, and/or the like. Such a data store may be likely to be used locally by the autonomous vehicle 304. One example of a data store is a highly reliable, high-speed RDBMS or key-value store executing on one or more computing devices and accessible over a high-speed packet switched network. Such data stores may be likely to be used by components of the route reservation system 302. One of ordinary skill in the art will recognize that separate data stores described herein may be combined into a single data store, and/or a single data store described herein may be separated into multiple data stores, without departing from the scope of the present disclosure.

The autonomous vehicle 304 is configured to receive routes from the route reservation system 302, and to autonomously navigate along the route. In some embodiments, the autonomous vehicle 304 is an aircraft. In other embodiments, any other type of autonomous vehicle 304 capable of navigating along a route, such as a wheeled vehicle, may be used. As shown, the autonomous vehicle 304 includes a communication interface 316, one or more vehicle state sensor devices 318, a power supply 320, one or more processors 314, one or more propulsion devices 322, and a computer-readable medium 324.

In some embodiments, the communication interface 316 includes hardware and software to enable any suitable communication technology for communicating with the route reservation system 302. In some embodiments, the communication interface 316 includes multiple communication interfaces 316, each for use in appropriate circumstances. For example, the communication interface 316 may include a long-range wireless interface such as a 4G or LTE interface, or any other type of long-range wireless interface (e.g., 2G, 3G, 5G, or WiMAX), to be used to communicate with the route reservation system 302 while traversing a route. The communication interface 316 may also include a medium-range wireless interface such as a Wi-Fi interface to be used when the autonomous vehicle 304 is at an area near a start location or an endpoint where Wi-Fi coverage is made available by the provider of the route reservation system 302. The communication interface 316 may also include a short-range wireless interface such as a Bluetooth interface to be used when the autonomous vehicle 304 is in a maintenance location or is otherwise stationary and waiting to be assigned a route. The communication interface 316 may also include a wired interface, such as an Ethernet interface or a USB interface, which may also be used when the autonomous vehicle 304 is in a maintenance location or is otherwise stationary and waiting to be assigned a route.

In some embodiments, the vehicle state sensor devices 318 are configured to detect states of various components of the autonomous vehicle 304, and to transmit signals representing those states to other components of the autonomous vehicle 304. Some non-limiting examples of vehicle state sensor devices 318 include a battery state sensor and a propulsion device health sensor.

In some embodiments, the power supply 320 may be any suitable device or system for storing and/or generating power. Some non-limiting examples of a power supply 320 include one or more batteries, one or more solar panels, a fuel tank, and combinations thereof. In some embodiments, the propulsion devices 322 may include any suitable devices for causing the autonomous vehicle 304 to travel along the path. For an aircraft, the propulsion devices 322 may include devices such as, but not limited to, one or more motors, one or more propellers, and one or more flight control surfaces. For a wheeled vehicle, the propulsion devices 322 may include devices such as, but not limited to, one or more motors, one or more wheels, and one or more steering mechanisms. In some embodiments, the processors 314 may include any type of computer processor capable of receiving signals from other components of the autonomous vehicle 304 and executing instructions stored on the computer-readable medium 324. In some embodiments, the computer-readable medium 324 may include one or more devices capable of storing information for access by the processors 314. In some embodiments, the computer-readable medium 324 may include one or more of a hard drive, a flash drive, an EEPROM, and combinations thereof.

As shown, the computer-readable medium 324 has stored thereon a route data store 326, a route confirmation engine 328, and a route traversal engine 330. In some embodiments, the route confirmation engine 328 is configured to analyze a route received from the route reservation system 302 to determine whether the autonomous vehicle 304 is capable of traversing the route, including but not limited to determining whether adequate power is available to complete the route, and determining whether performance capabilities for traversing the route are available. In some embodiments, the route traversal engine 330 is configured to cause the propulsion devices 322 to propel the autonomous vehicle 304 through the route received from the route reservation system 302. The route traversal engine 330 may use signals from other devices, such as GPS sensor devices, vision-based navigation devices, accelerometers, LIDAR devices, and/or other devices that are not illustrated or described further herein, to assist in positioning and navigation as is typical for an autonomous vehicle 304.

Further details regarding the functionality of the route reservation system 302 and the autonomous vehicle 304 are provided below.

Figure 4A:
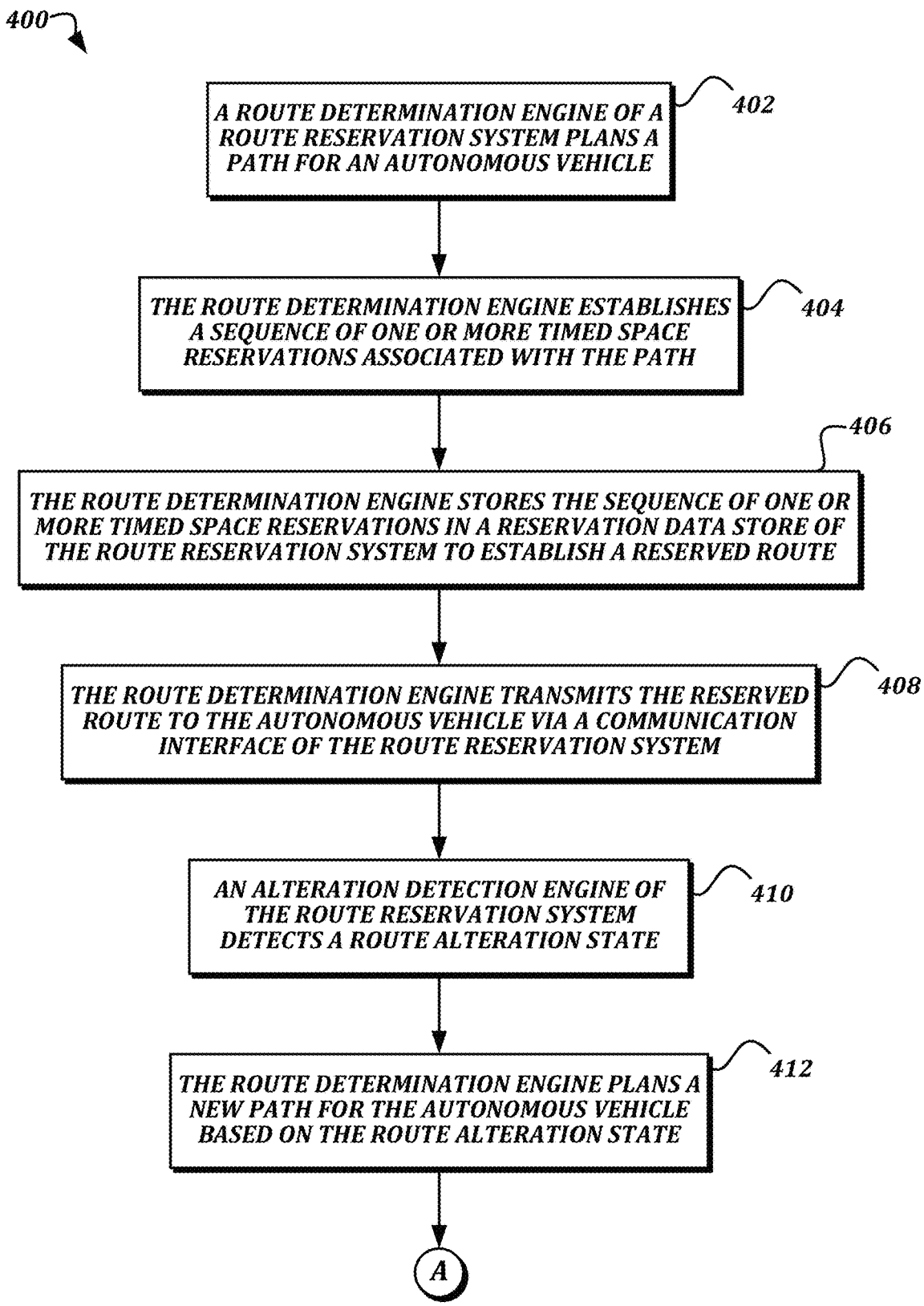
FIGS. 4A-4B are a flowchart that illustrates a non-limiting example embodiment of a method of optimizing routes for autonomous vehicles according to various aspects of the present disclosure.
Figure 4B:
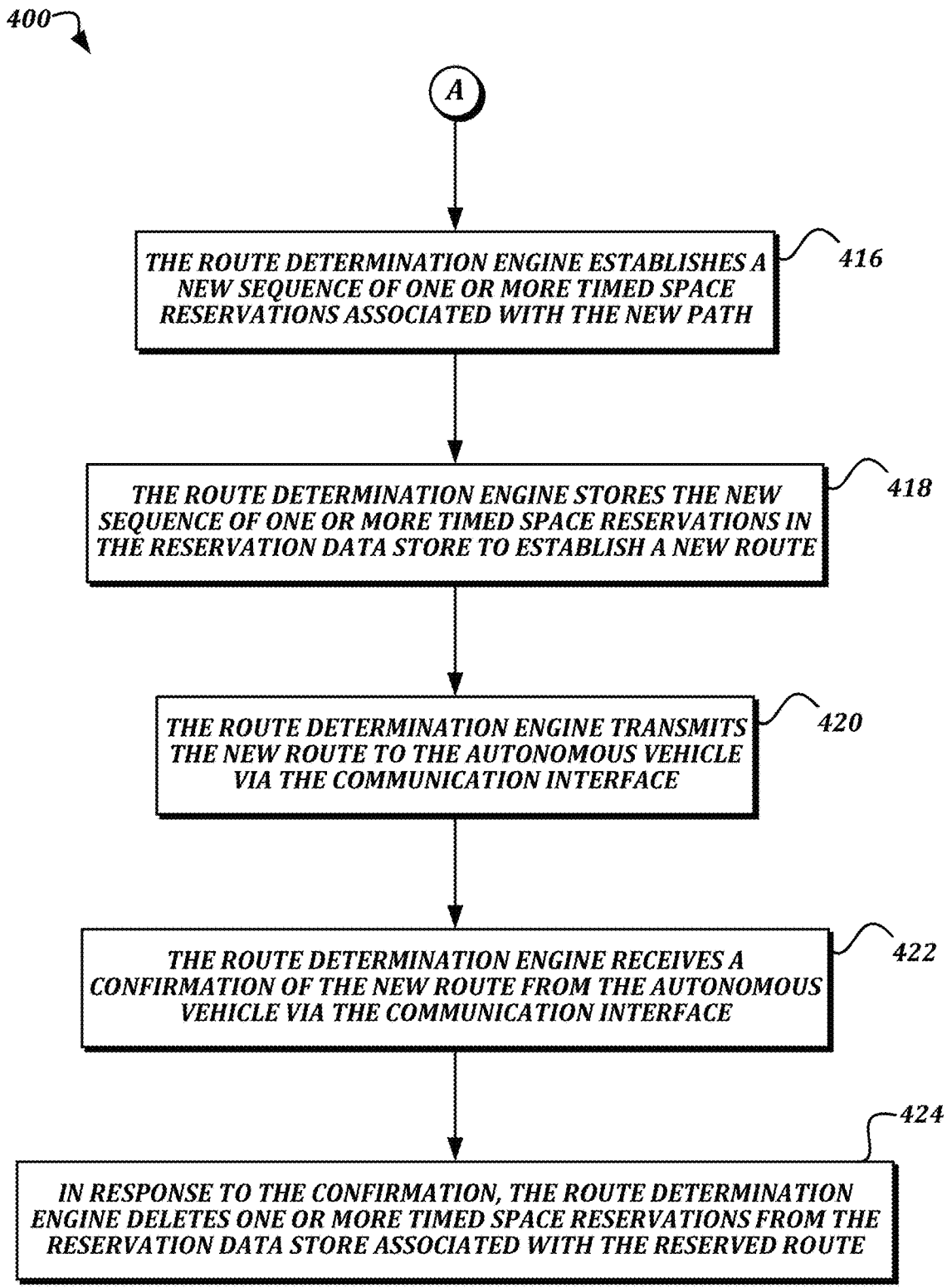

FIGS. 4A-4B are a flowchart that illustrates a non-limiting example embodiment of a method of optimizing routes for autonomous vehicles according to various aspects of the present disclosure. At block 402, a route determination engine 306 of a route reservation system 302 plans a path for an autonomous vehicle 304. In some embodiments, the path may be planned in order to start from a start location and pass through one or more waypoints before returning to an end point. In some embodiments, activities for each waypoint (such as deliveries) may also be included in the path. In some embodiments, the path planning may involve ordering the waypoints for efficient straight-line travel between the segments of the path. In some embodiments, a path finding algorithm such as A*, Dijkstra's algorithm, the Bellman-Ford algorithm, or other path finding algorithms may be used to plan the specific paths between the points.

In some embodiments, the end portion of the path may direct the vehicle to a waiting location, where the vehicle will wait as long as possible before traveling to default safe end point. For example, the path for an aircraft may include a hover in a waiting area 204 until a predetermined amount of time has passed, a battery level reaches a low battery threshold level, or some other wait termination state has been detected. Once the wait termination state is detected, the aircraft will follow the remainder of the path to a landing area. The landing area may be managed by a crew of operators ready to remove incoming aircraft in order to avoid conflicts. In this way, the vehicle is given a path that is safe from beginning to end, even if the vehicle does not receive an updated path from the waiting area 204 to an intended end point as described below. Landing at the default safe end point should be rare, as it would occur in cases in which the route reservation system 302 cannot provide the vehicle with an updated path to the intended end point.

At block 404, the route determination engine 306 establishes a sequence of one or more timed space reservations associated with the path. To establish the sequence, the route determination engine 306 may break the path up into segments which are expected to be traversed in a given amount of time based on capabilities of the vehicle. Starting at a first segment corresponding to the start location, the route determination engine 306 determines a time at which the space associated with the first segment of the path is not reserved by any other existing timed space reservation stored in the reservation data store 312. Once a time is found, the route determination engine 306 creates a timed space reservation for that time and space, and then creates a subsequent timed space reservation for the next segment of the path. As discussed above, the time duration of each timed space reservation in the sequence may increase through the sequence in order to accommodate increasing uncertainty regarding the location of the vehicle traveling the path. In some embodiments, the established timed space reservations may be altered if conflicts are found later in the path. In some embodiments, the path may be changed from an optimal path found at block 402 while establishing the sequence of timed space reservations in order to avoid conflicting timed space reservations. Such detours may be marked in the sequence, and may be removed if the conflict is later resolved (as discussed further below).

Figure 7A:
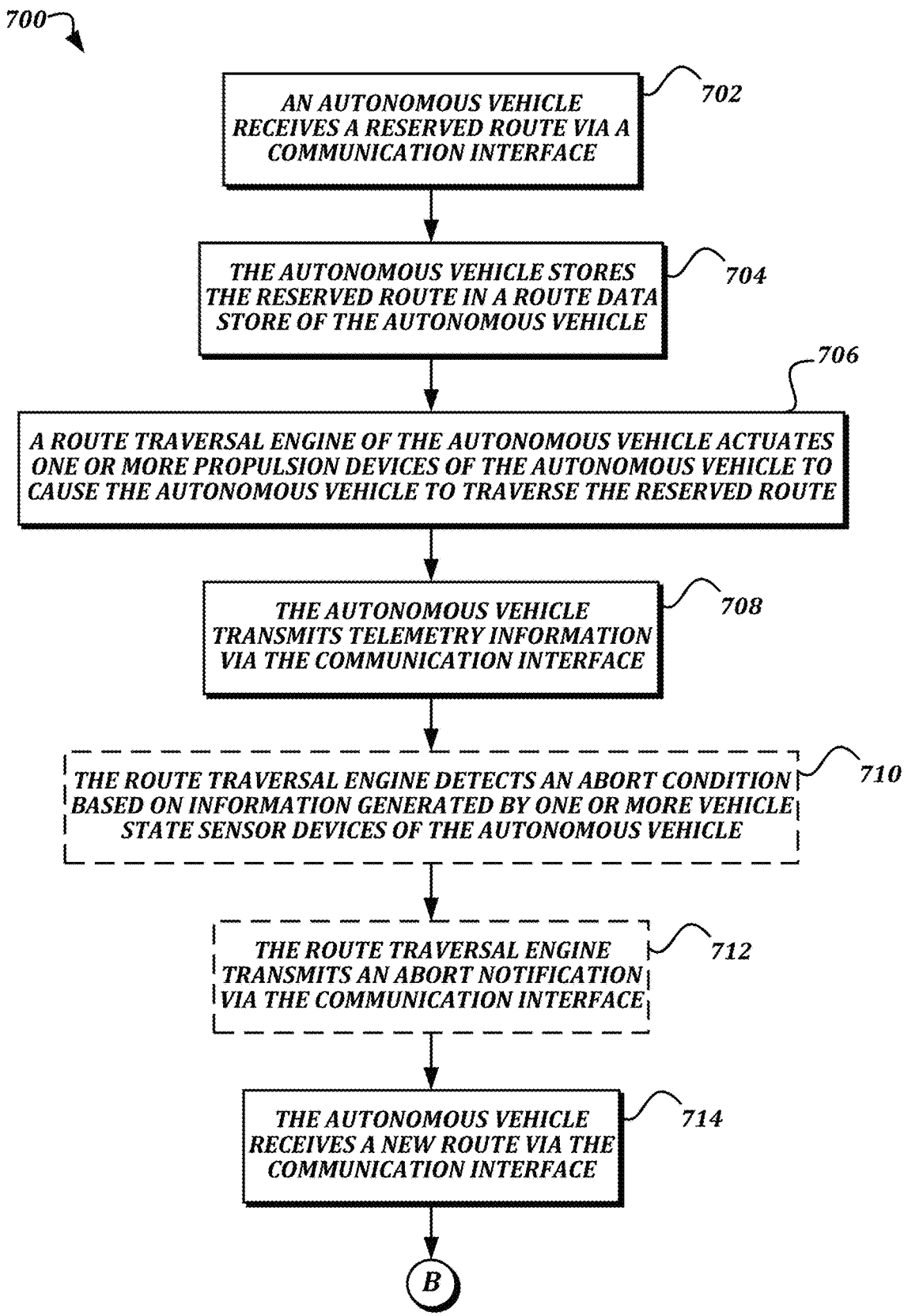
FIGS. 7A-7B are a flowchart that illustrates a non-limiting example embodiment of a method for an autonomous vehicle to navigate optimized routes according to various aspects of the present disclosure.
Figure 7B:
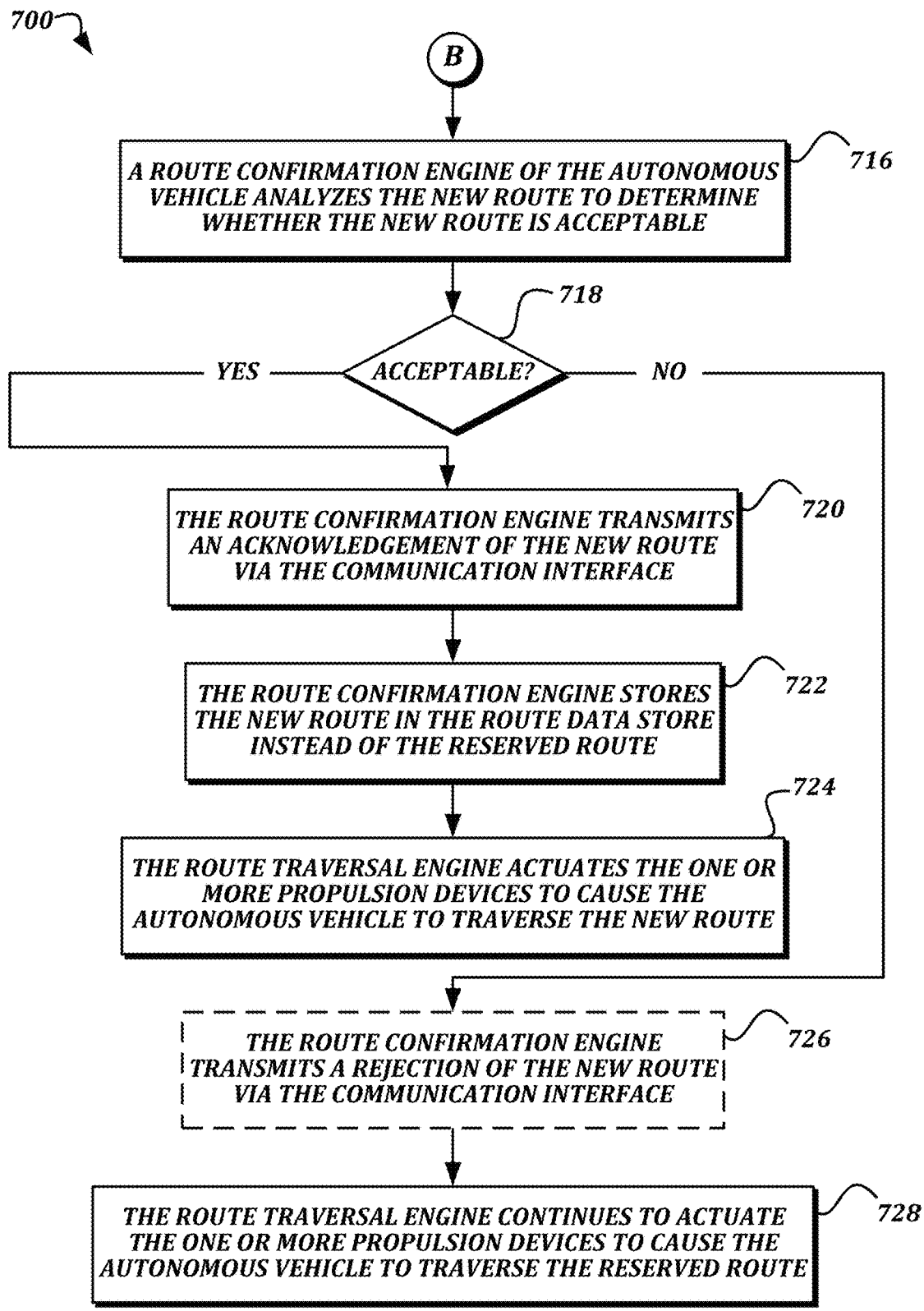

At block 406, the route determination engine 306 stores the sequence of one or more timed space reservations in a reservation data store 312 of the route reservation system 302 to establish a reserved route. In some embodiments, once the sequence of timed space reservations is stored in the reservation data store 312 as a reserved route, the timed space reservations exclude other overlapping timed space reservations. At block 408, the route determination engine transmits the reserved route to the autonomous vehicle 304 via a communication interface 308 of the route reservation system 302. The autonomous vehicle 304 receives the reserved route, and uses the reserved route as instructions for travel as illustrated in FIGS. 7A-7B and discussed further below.

At block 410, an alteration detection engine 310 of the route reservation system 302 detects a route alteration state. In some embodiments, a route alteration state is any state that can be detected by the route reservation system 302 that indicates that a reserved route can or should be altered. One non-limiting example includes detecting that an autonomous vehicle 304 has arrived at the waiting area 204, is approaching the waiting area 204, or is otherwise within a close proximity to an endpoint of its reserved route. In some embodiments, the route reservation system 302 may detect that the autonomous vehicle 304 has arrived based on location telemetry transmitted by the autonomous vehicle 304 to the route reservation system 302. In some embodiments, the route reservation system 302 may detect that the autonomous vehicle 304 has arrived based on a medium-range network signal (such as a Wi-Fi signal) being received from the autonomous vehicle 304 by a medium-range wireless network associated with the waiting area 204 or other endpoint of the reserved route.

Another non-limiting example of a route alteration state is an abort state. In some embodiments, the autonomous vehicle 304 may be able to detect issues that lead to a situation where the autonomous vehicle 304 may not be able to safely complete the previously reserved route. For example, the autonomous vehicle 304 may detect failure or performance degradation of a propulsion device 322, may detect failure of a sensor, may detect that an amount of power available from a power supply 320 has dropped below an acceptable level, may detect that a battery charge level has dropped below a safety threshold, may detect a non-navigable obstacle, or may detect any other state that would prevent the autonomous vehicle 304 from safely completing the reserved route. In some embodiments, the autonomous vehicle 304 may wireless transmit a notification that it has detected the abort state to the route reservation system 302 along with telemetry information. In some embodiments, the route reservation system 302 may determine that the abort state is present based on telemetry information that does not include the notification. For example, the route reservation system 302 may detect that a battery charge level has dropped below a safety threshold based on telemetry information that directly reports the battery charge level.

Still another non-limiting example of a route alteration state is a detection of an emergency condition that did not exist when the reserved route was calculated. For example, the route reservation system 302 may receive a signal that indicates that a volume of airspace has been declared a temporary no-fly zone due to a disaster, a civil disturbance, an unplanned event, or some other emergency; or a signal that indicates that a road is closed due to an accident or for any other reason. In such cases, the route reservation system 302 may attempt to provide a new route to the vehicle that avoids the emergency area.

Figure 5A:
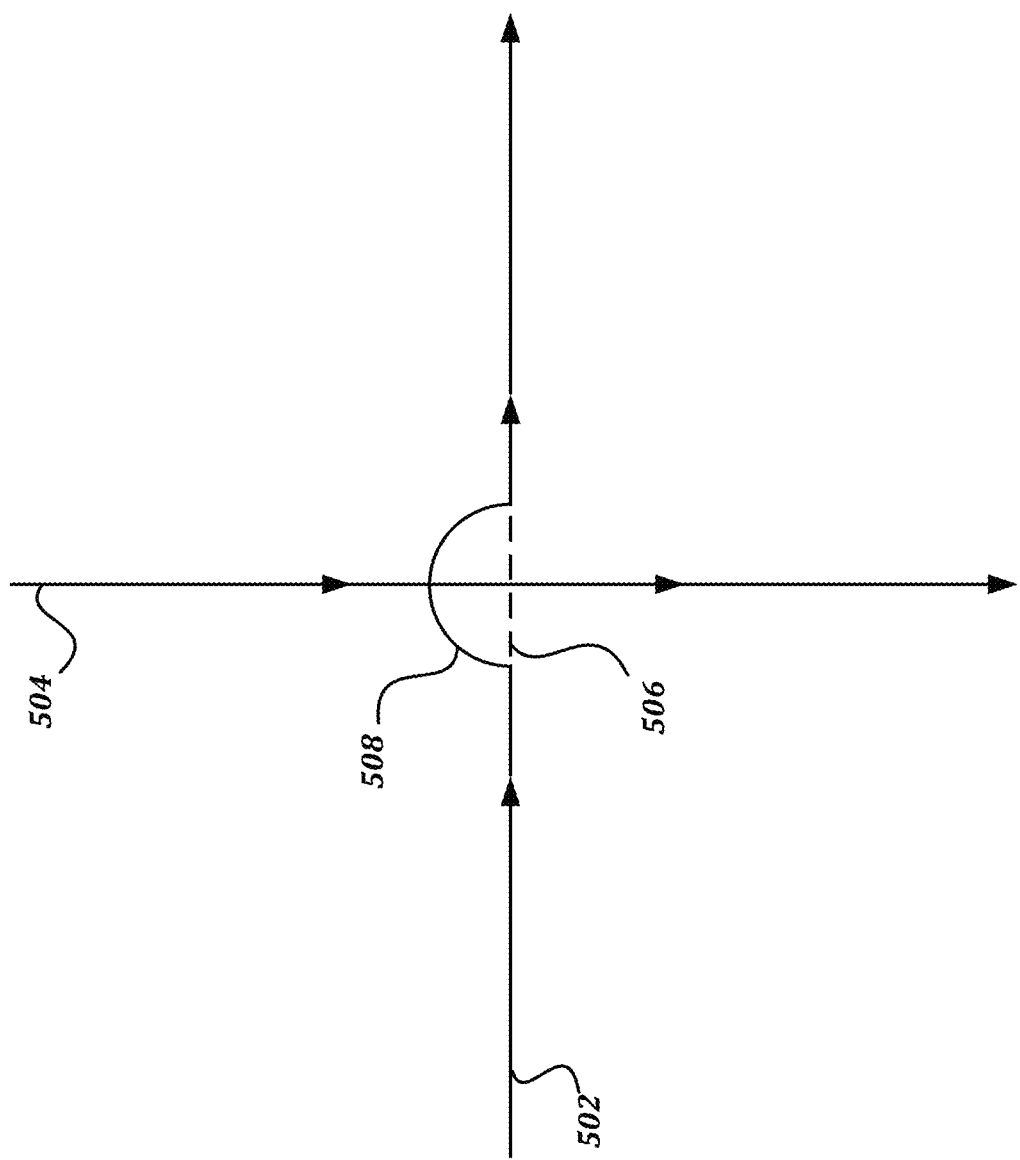
FIGS. 5A-5C illustrate an example embodiment of a route with a detour, and a removal of the detour according to various aspects of the present disclosure.
Figure 5B:
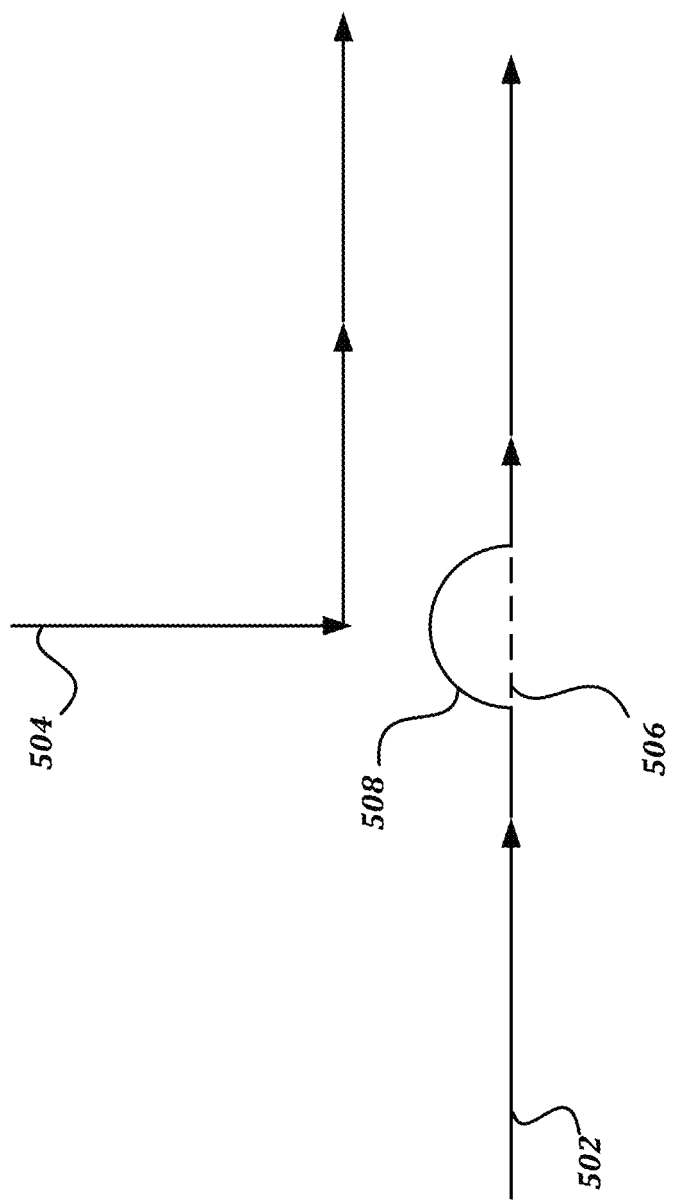
Figure 5C:
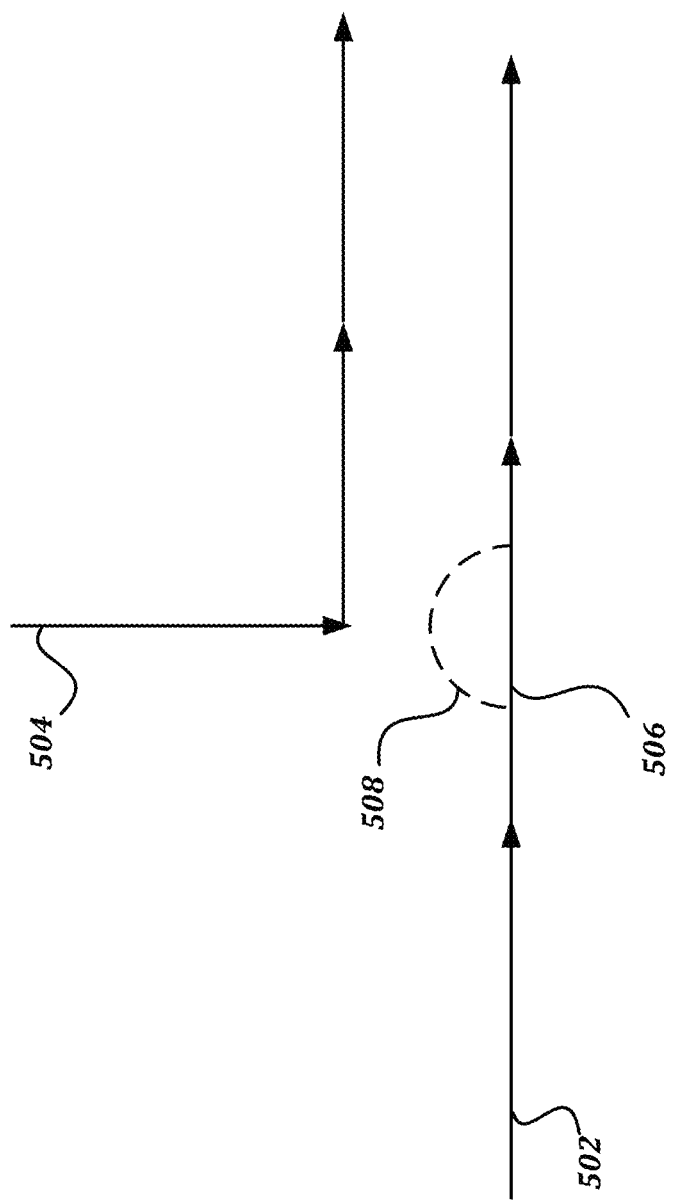

Yet another non-limiting example of a route alteration state is the removal of a need for a detour. As discussed above, detours in the optimal path may be recorded by the route determination engine 306. This recordation of detours may also record the reason for the detour, thus allowing an opportunity to remove the detour if the reason for the detour is resolved. FIGS. 5A-5C illustrate an example embodiment of a route with a detour, and a removal of the detour according to various aspects of the present disclosure. As shown in FIG. 5A, a first route 504 extends from a top of the FIGURE and travels vertically down the FIGURE. Each vertical arrow denotes a timed space reservation of the first route 504.

A second route 502 is then planned by the route determination engine 306 to extend from a left side of the FIGURE and travel horizontally to the right through the FIGURE. A first timed space reservation of the second route 502 does not have any conflicts. A second timed space reservation of the second route 502 conflicts with a timed space reservation of the first route 504. If the first route 504 was established while the second route 502 was being planned, the route determination engine 306 may create a detour for the second route 502 to avoid the conflict. As shown, the optimal route is indicated by a dashed arrow 506, while the detour route that avoids the conflict is indicated by a curved arrow 508. With no further changes, a first autonomous vehicle would travel vertically along the first route 504, and a second autonomous vehicle would travel horizontally along the second route 502, detouring along the curved path 508 to avoid the first route 504.

FIG. 5B illustrates a route alteration state wherein the need for the detour has been removed. As shown, the second route 502 is currently the same, and still includes the detour 508. However, the first route 504 has been updated such that its second illustrated timed space reservation and its third illustrated timed space reservation no longer pose a conflict for the second route 502. This may occur for any reason, including but not limited to the first route 502 having been altered in response to detecting a route alteration state. The alteration detection engine 310 may be configured to detect this state, in which the detour is no longer needed. As will be discussed further below, FIG. 5C illustrates an example result of planning a new route in response to the removal of the need for the detour. As shown, the optimal path 506 has been used for the new path, and the detour 508 has been removed (but remains illustrated in dashed line for discussion purposes only).

The arrows and curves shown in FIGS. 5A-5C are simplified examples for the purpose of discussion only. In some embodiments, the paths, routes, and detours determined by the route determination engine 306 may include safety margins instead of merely being lines, and may include paths through three-dimensional space instead of two-dimensional areas.

Returning to FIG. 4A, at block 412, the route determination engine 306 plans a new path for the autonomous vehicle 304 based on the route alteration state. The new path takes the route alteration state into consideration while planning the new path. As a non-limiting example, if the route alteration state is a detection that the autonomous vehicle 304 has arrived at or near the waiting area 204, the new path may proceed from the waiting area 204 (or current vehicle location) directly to the endpoint without further pause in the waiting area 204. As another non-limiting example, if the route alteration state is an abort state, the new path may proceed from the current vehicle location to a maintenance location or other safe landing area, or may proceed from the current vehicle location through a simplified path that can still be accomplished despite the reasons for the abort state. As yet another non-limiting example, if the route alteration state is the removal of a need for a detour, the new path may return to the optimal path that was avoided by the detour (as illustrated in FIG. 5C). A similar technique may be used to plan the new path as was used to plan the original path at block 402. The new path may be planned in such a way that it branches off from the original path without any discontinuities in position or velocity.

The method 400 proceeds to a continuation terminal ("terminal A"). From terminal A (FIG. 4B), the method proceeds to block 416. At block 416, the route determination engine 306 establishes a new sequence of one or more timed space reservations associated with the new path, and at block 418, the route determination engine 306 stores the new sequence of one or more timed space reservations in the reservation data store 312 to establish a new route. Similar to block 404, the route determination engine 306 may break the new path up into segments which are expected to be traversed in a given amount of time based on capabilities of the vehicle, and may determine times at which the space associated with each segment is free according to other timed space reservations stored in the reservation data store 312 before creating timed space reservations for the segments. In some embodiments, the individual timed space reservations of the new sequence may be shorter in duration than the remaining timed space reservations of the reserved route, because the new sequence does not have to compensate for the accumulated uncertainty in arrival times from the earlier portions of the reserved route. The reduced durations of the new sequence may make it easier to avoid conflicts between the new sequence and other routes stored in the reservation data store 312. This may be particularly useful for high-traffic paths, such as a path from a common waiting area 204 to an endpoint within a warehouse 202.

Figure 6:
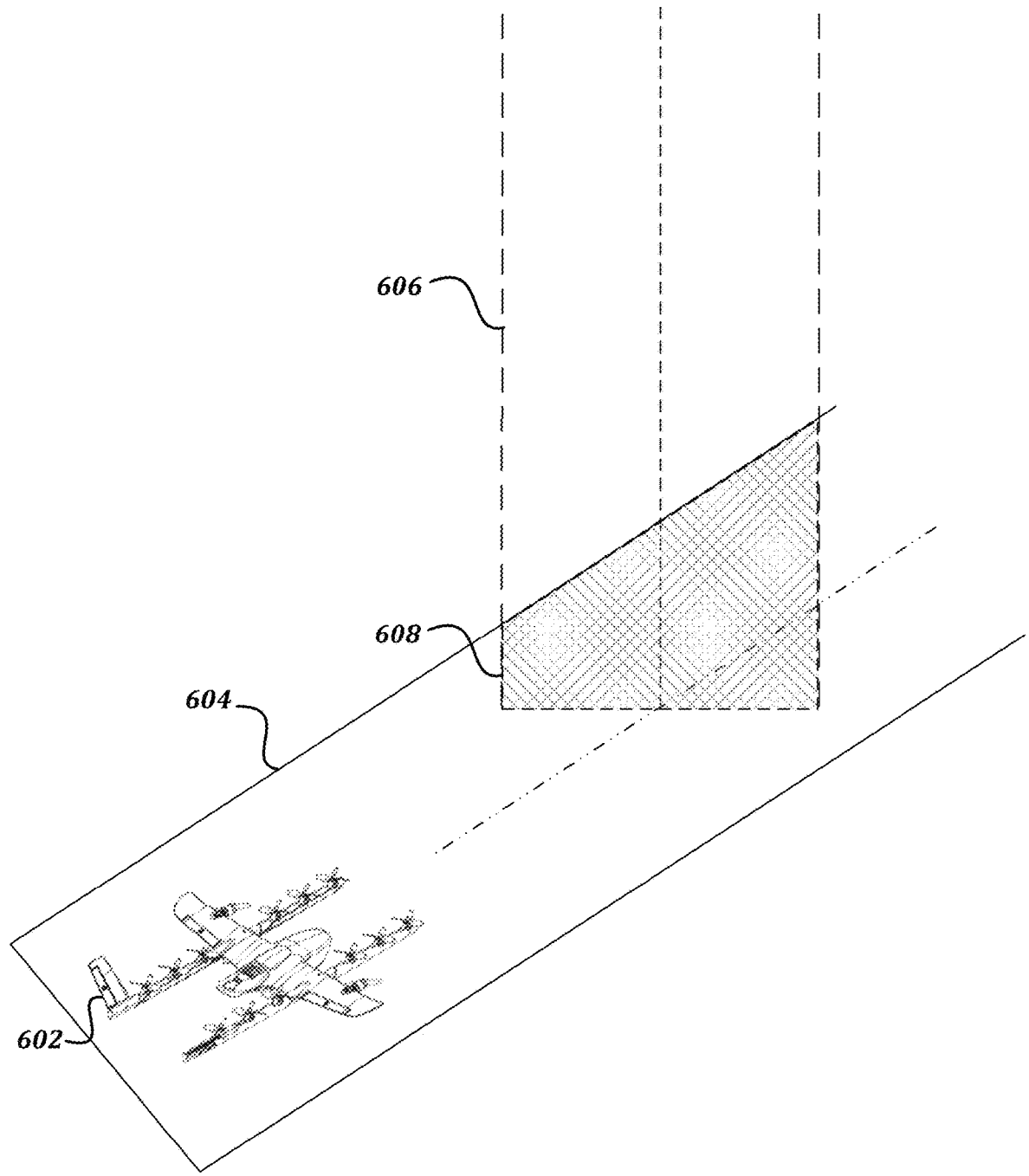
FIG. 6 illustrates an example of how a new sequence of timed space reservations may conflict with existing timed space reservations according to various aspects of the present disclosure.

One complication that arises when establishing a new sequence of timed space reservations is that at least some of the new timed space reservations are likely to overlap the existing timed space reservations. FIG. 6 illustrates an example of how a new sequence of timed space reservations may conflict with existing timed space reservations according to various aspects of the present disclosure. As shown, an autonomous vehicle 602 is associated with and is currently traveling on a reserved route 604. At some point, a route alteration state was detected, and the route determination engine 306 planned a new path which involves a left turn from the existing reserved route 604. The timed space reservations for the new route 606 overlap with the reserved route 604 in at least the shaded overlap area 608, because for at least some portion of the new route 606, the autonomous vehicle 602 will be in a space that was also part of the reserved route 604 at the same time.

If the route determination engine 306 attempts to avoid all conflicts between timed space reservations, then planning the new route 606 will not be possible due to the conflict in the overlap area 608. Accordingly, in some embodiments, the route determination engine 306 ignores conflicts between timed space reservations when planning a new route, if the conflicts are between timed space reservations for the same autonomous vehicle 602. Such conflicts will not lead to a reduction in safety, because the same autonomous vehicle 602 cannot conflict with itself.

Another complication that may arise when establishing a new sequence of timed space reservations may be that multiple autonomous vehicles are concurrently experiencing a route alteration state, and may be concurrently awaiting travel via a common path. For example, multiple autonomous vehicles may have arrived at the waiting area 204 near the endpoint at around the same time, and may all be waiting assignments of new routes to travel from the waiting area 204 to the endpoint. In such embodiments, the route determination engine 306 may prioritize the multiple autonomous vehicles using any suitable technique. As a non-limiting example, the route determination engine 306 may use the telemetry information to determine an autonomous vehicle with a lowest battery state of charge, and may provide a new route that is earlier in time than new routes provided to the other autonomous vehicles. As another non-limiting example, the route determination engine 306 may determine a capability desired at the endpoint, such as an autonomous vehicle with a particular cargo capacity, or an autonomous vehicle with a battery state of charge that is adequate to serve a subsequent mission with minimal recharging, and may prioritize an autonomous vehicle with the desired capability to have an earlier route than the other autonomous vehicles.

At block 420, the route determination engine 306 transmits the new route to the autonomous vehicle 304 via the communication interface 308. In some embodiments, the transmission to the autonomous vehicle 304 may occur via a connectionless protocol. Due to the uncertainty in the transmission, and the potential lack of persistent network connectivity for autonomous vehicles operating out of line of sight, the route determination engine 306 cannot be certain that the autonomous vehicle 304 received the new route. Also, in some embodiments, the autonomous vehicle 304 may separately decide whether to accept or reject the new route. Accordingly, at this point, the route determination engine 306 cannot be certain whether the autonomous vehicle 304 will travel along the new route or the original reserved route, and so the route determination engine 306 continues to store both the timed space reservations for the reserved route and the timed space reservations for the new route in the reservation data store 312. This ensures that the autonomous vehicle 304 will be traveling through reserved spaces regardless of which route it chooses to follow.

At block 422, the route determination engine 306 receives a confirmation of the new route from the autonomous vehicle 304 via the communication interface 308. The confirmation indicates that the autonomous vehicle 304 has accepted the new route, and will travel along the new route instead of the reserved route. At block 424, in response to the confirmation, the route determination engine 306 deletes one or more timed space reservations from the reservation data store 312 associated with the reserved route. In some embodiments, the route determination engine 306 may instead receive a rejection of the new route from the autonomous vehicle 304, indicating that the autonomous vehicle 304 will instead travel along the original reserved route. In such cases, the route determination engine 306 may delete one or more timed space reservations from the reservations data store associated with the new route.

FIGS. 7A-7B are a flowchart that illustrates a non-limiting example embodiment of a method for an autonomous vehicle to navigate optimized routes according to various aspects of the present disclosure.

At block 702, an autonomous vehicle 304 receives a reserved route via a communication interface 316. In some embodiments, the reserved route includes both a path to be traveled by the autonomous vehicle 304 and at least a time at which the autonomous vehicle 304 should start traversing the path. In some embodiments, the reserved route received by the autonomous vehicle 304 may also include indications of the timed space reservations so that the autonomous vehicle 304 may time its travel to coincide with the timed space reservations throughout the reserved route. At block 704, the autonomous vehicle 304 stores the reserved route in a route data store 326 of the autonomous vehicle 304.

At block 706, a route traversal engine 330 of the autonomous vehicle 304 actuates one or more propulsion devices 322 of the autonomous vehicle 304 to cause the autonomous vehicle 304 to traverse the reserved route. For example, the route traversal engine 330 may wait until a start time determined based on the reserved route, and then activate one or more propellers or wheels of the autonomous vehicle 304 to begin traversing the route. The route traversal engine 330 may use signals from various devices to determine a position of the autonomous vehicle 304, and may use the position of the autonomous vehicle 304 to vary the control inputs to the propulsion devices 322 in order to cause the autonomous vehicle 304 to traverse the route.

At block 708, the autonomous vehicle 304 transmits telemetry information via the communication interface 316.

The telemetry information may be received by the route reservation system 302. The telemetry information transmitted by the autonomous vehicle 304 may include information including, but not limited to, air speed, ground speed, heading, bearing, altitude, position, and battery level. The telemetry information may allow the alteration detection engine 310 to determine various route alteration states, such as the removal of the need for detours. The telemetry information may also allow the alteration detection engine 310 (or another component of the route reservation system 302) to check whether the autonomous vehicle 304 is operating within the expected timed space reservation times associated with the reserved route. The route reservation system 302 may use this information to broaden the existing timed space reservation times (if the autonomous vehicle 304 is trailing behind or leading ahead of the existing timed space reservation times), or to narrow the existing timed space reservation times (if the autonomous vehicle 304 is traveling as expected and the uncertainty for the future timed space reservations is therefore reduced). If the autonomous vehicle 304 is trailing behind the existing timed space reservation times, the route reservation system 302 may detect this as a route alteration state, and may plan a new route based on the actual position of the autonomous vehicle 304.

At optional block 710, the route traversal engine 330 detects an abort condition based on information generated by one or more vehicle state sensor devices 318 of the autonomous vehicle 304, and at optional block 712, the route traversal engine 330 transmits an abort notification via the communication interface 316. As discussed above, the abort condition may include a state in which the route traversal engine 330 has determined, based on the information, that the autonomous vehicle 304 will not be able to safely complete the reserved route. As a non-limiting example, the route traversal engine 330 may determine that a battery charge level is too low to safely reach the end of the reserved route. As another non-limiting example, the route traversal engine 330 may determine that a component of the autonomous vehicle 304, such as a propulsion device 322, has failed and requires repair. Blocks 710 and 712 are illustrated as optional because the route traversal engine 330 may not detect an abort condition before completing the reserved route (or at least returning to the waiting area 204 or other area near the endpoint of the reserved route).

At block 714, the autonomous vehicle 304 receives a new route via the communication interface 316. The received new route is the new route determined by the route determination engine 306 in response to detecting the route alteration state. The method 700 proceeds to a continuation terminal ("terminal B"). From terminal B (FIG. 7B), the method 700 proceeds to block 716. At block 716, a route confirmation engine 328 of the autonomous vehicle 304 analyzes the new route to determine whether the new route is acceptable. In some embodiments, the route confirmation engine 328 may analyze the new route by determining whether a battery state of charge is adequate to safely complete the new route. In some embodiments, the route confirmation engine 328 may analyze the new route by determining whether performance characteristics of the autonomous vehicle 304, including one or more of a turning radius, a maximum or minimum operational altitude, and a maximum or minimum operational speed, are adequate to traverse the new route. In some embodiments, the route confirmation engine 328 may analyze the new route to ensure that switching to the new route from the reserved route would not require any discontinuities in position or velocity.

At decision block 718, a determination is made based on whether the new route was found to be acceptable. If the route was found to be acceptable, then the result of decision block 718 is YES, and the method 700 proceeds to block 720. At block 720, the route confirmation engine 328 transmits an acknowledgement of the new route via the communication interface 316. The acknowledgement indicates that the autonomous vehicle 304 will start to traverse the new route instead of the reserved route. At block 722, the route confirmation engine 328 stores the new route in the route data store 326 instead of the reserved route. In some embodiments, the route confirmation engine 328 may delete the reserved route from the route data store 326, because it is no longer needed by the route traversal engine 330. At block 724, the route traversal engine 330 actuates the one or more propulsion devices 322 to cause the autonomous vehicle 304 to traverse the new route.

Returning to decision block 718, if the route was not found to be acceptable, then the result of decision block 718 is NO, and the method 700 proceeds to optional block 726. At optional block 726, the route confirmation engine 328 transmits a rejection of the new route via the communication interface 316. The rejection indicates that the autonomous vehicle 304 will continue along the reserved route instead of the new route. Block 726 is illustrated as optional because the route reservation system 302 may assume that the new route is rejected if an acknowledgement is not received, and so transmittal of the rejection may not be necessary for safe operation. Transmitting the rejection may allow the route reservation system 302 to operate more efficiently, because fewer unused timed space reservations would be present in the reservation data store 312. At block 728, the route traversal engine 330 continues to actuate the one or more propulsion devices 322 to cause the autonomous vehicle 304 to traverse the reserved route.

While illustrative embodiments have been illustrated and described, it will be appreciated that various changes can be made therein without departing from the spirit and scope of the invention.

The invention claimed is:

1. A non-transitory computer-readable medium having computer-executable instructions stored thereon that, in response to execution by one or more processors of one or more computing devices, cause the computing devices to perform actions for updating a reserved route for an autonomous vehicle, wherein the reserved route includes one or more timed space reservations, the actions comprising:
   planning a new route to replace the reserved route;
   transmitting the new route to the autonomous vehicle; and
   in response to receiving a confirmation from the autonomous vehicle that the new route was accepted, deleting the one or more timed space reservations associated with the reserved route.

2. The computer-readable medium of claim 1, wherein the autonomous vehicle is an aircraft.

3. The computer-readable medium of claim 1, wherein the actions further comprise detecting a route alteration state that triggers planning the new route.

4. The computer-readable medium of claim 3, wherein the reserved route includes one or more detour segments around at least one conflicting timed space reservation, and wherein detecting the route alteration state that triggers planning the new route includes detecting that the at least one conflicting timed space reservation has been deleted.

5. The computer-readable medium of claim 3, wherein detecting the route alteration state that triggers planning the new route includes detecting a failure state on the autonomous vehicle.

6. The computer-readable medium of claim 3, wherein the reserved route includes a timed space reservation for a waiting location near an endpoint of the reserved route, and wherein detecting the route alteration state that triggers planning the new route includes detecting that the autonomous vehicle has arrived at the waiting location.

7. The computer-readable medium of claim 6, wherein the autonomous vehicle is an aircraft, wherein the waiting location is a hover location, and wherein planning the new route to replace the reserved route includes establishing a sequence of timed space reservations from the hover location to the endpoint.

8. The computer-readable medium of claim 7, wherein the endpoint is inside a building, and wherein establishing the sequence of timed space reservations from the hover location to the endpoint includes establishing a sequence of timed space reservations that pass through an opening in the building to reach the endpoint.

9. The computer-readable medium of claim 1, wherein planning the new route to replace the reserved route includes:
determining a path from a current location to an end point via one or more waypoints;
determining a time during which no conflicting timed space reservations exist for the path; and
adding one or more timed space reservations to the new route for segments of the path.

10. The computer-readable medium of claim 9, wherein determining the time during which no conflicting timed space reservations exist for the path includes ignoring conflicting timed space reservations associated with the autonomous vehicle.

11. The computer-readable medium of claim 9, wherein determining the time during which no conflicting timed space reservations exist for the path includes prioritizing multiple autonomous vehicles with conflicting paths.

12. The computer-readable medium of claim 11, wherein prioritizing multiple autonomous vehicles with conflicting paths includes prioritizing multiple autonomous vehicles with conflicting paths based on battery states of the multiple autonomous vehicles.

13. The computer-readable medium of claim 12, wherein prioritizing multiple autonomous vehicles with conflicting paths based on battery states includes providing an earliest timed space reservation to an autonomous vehicle having a lowest battery state of charge.

14. The computer-readable medium of claim 12, wherein prioritizing multiple autonomous vehicles with conflicting paths based on battery states includes providing an earliest timed space reservation to an autonomous vehicle having a battery state of charge that matches a requirement for a pending mission.

15. The computer-readable medium of claim 11, wherein prioritizing multiple autonomous vehicles with conflicting paths includes prioritizing multiple autonomous vehicles with conflicting paths based on whether the autonomous vehicles include features needed for a pending mission.

16. An autonomous vehicle, comprising:
a communication interface;
one or more propulsion devices;
one or more processors; and
a computer-readable medium having computer-executable instructions stored thereon that, in response to execution by the one or more processors, cause the autonomous vehicle to perform actions including:
operating the propulsion devices to cause the autonomous vehicle to traverse a reserved route; and
while traversing the reserved route:
receiving, via the communication interface, an updated route;
analyzing the updated route to determine whether the updated route is acceptable, wherein analyzing the updated route to determine whether the updated route is acceptable includes at least one of:
determining a predicted power usage for completing the updated route and comparing the predicted power usage to a battery state of charge; and
determining one or more vehicle performance characteristics for completing the updated route and comparing the one or more vehicle performance characteristics to performance characteristics of the autonomous vehicle; and
in response to determining that the updated route is acceptable:
transmitting, via the communication interface, an acknowledgement of the updated route; and
operating the propulsion devices to cause the autonomous vehicle to traverse the updated route instead of the reserved route.

17. The autonomous vehicle of claim 16, wherein the autonomous vehicle is an aircraft, and wherein the propulsion devices include at least one of a propeller and a flight control surface.

18. The autonomous vehicle of claim 16, further comprising one or more vehicle state sensor devices, and wherein the actions further include:
detecting an abort condition based on information generated by the one or more vehicle state sensor devices; and
transmitting an abort notification via the communication interface.

19. A computer-readable medium having computer-executable instructions stored thereon that, in response to execution by one or more processors of an autonomous vehicle, cause the autonomous vehicle to perform actions including:
operating propulsion devices of the autonomous vehicle to cause the autonomous vehicle to traverse a reserved route; and
while traversing the reserved route:
receiving, via a communication interface of the autonomous vehicle, an updated route;
analyzing the updated route to determine whether the updated route is acceptable, wherein analyzing the updated route to determine whether the updated route is acceptable includes at least one of:
determining a predicted power usage for completing the updated route and comparing the predicted power usage to a battery state of charge; and
determining one or more vehicle performance characteristics for completing the updated route and comparing the one or more vehicle performance characteristics to performance characteristics of the autonomous vehicle; and
in response to determining that the updated route is acceptable:
transmitting, via the communication interface, an acknowledgement of the updated route; and operating the propulsion devices to cause the autonomous vehicle to traverse the updated route instead of the reserved route.

20. The computer-readable medium of claim 19, wherein the actions further comprise:
   detecting an abort condition based on information generated by one or more vehicle state sensor devices of the autonomous vehicle; and
   transmitting an abort notification via the communication interface.

* * * * *